United States Patent
Jagyasi et al.

(10) Patent No.: US 10,555,461 B2
(45) Date of Patent: Feb. 11, 2020

(54) SYSTEMS AND METHODS FOR ESTIMATING EFFECTIVE PEST SEVERITY INDEX

(71) Applicant: Tata Consultancy Services Limited, Mumbai (IN)

(72) Inventors: Bhushan Gurmukhdas Jagyasi, Thane (IN); Jayantrao Mohite, Thane (IN); Srinivasu Pappula, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 228 days.

(21) Appl. No.: 15/066,891

(22) Filed: Mar. 10, 2016

(65) Prior Publication Data
US 2017/0188521 A1 Jul. 6, 2017

(30) Foreign Application Priority Data
Jan. 4, 2016 (IN) .............................. 201621000220

(51) Int. Cl.
*A01G 22/00* (2018.01)
*G06Q 50/02* (2012.01)
(Continued)

(52) U.S. Cl.
CPC .............. *A01G 22/00* (2018.02); *A01C 14/00* (2013.01); *A01M 17/00* (2013.01); *A01M 99/00* (2013.01);
(Continued)

(58) Field of Classification Search
CPC ........ A01C 14/00; A01G 1/001; A01M 17/00; A01M 99/00; G01W 1/00; G06Q 50/02
(Continued)

(56) References Cited

U.S. PATENT DOCUMENTS

| 7,231,299 B2 * | 6/2007 | Egi ......................... G01W 1/00 702/3 |
| 7,731,984 B2 * | 6/2010 | Sztejnberg ............. A01N 63/04 424/195.15 |

(Continued)

FOREIGN PATENT DOCUMENTS

| CN | 201689457 | 12/2010 |
| CN | 103761674 | 4/2014 |

OTHER PUBLICATIONS

Jones et al., "Aweb-based decision support system to enhance IPM programs in Washington tree fruit" : Wiley Interscience, PestManag Sci , Society of Chemical Industry, http://enhanced.tfree.wsu.edu/downloads/%20DAS_pesticide_science.pdf, 9 pages, (2010).

(Continued)

*Primary Examiner* — Mohammed Shamsuzzaman
(74) *Attorney, Agent, or Firm* — Finnegan, Henderson, Farabow, Garrett & Dunner LLP

(57) ABSTRACT

Presence of natural enemies has a considerable impact on pest severity in a given geo-location. However, manually estimating pest severity or population of natural enemies is cumbersome, inaccurate and not scalable. Systems and methods of the present disclosure enable estimating effective pest severity index by receiving a first set of inputs pertaining to weather associated with a geo-location under consideration; receiving a second set of inputs pertaining to agronomic information; generating a pest forecasting model and a natural enemies forecasting model based on the received first set and the second set of inputs for each pest; and estimating the effective pest severity index based on the generated models. The timing and quantity of pesticide application can be optimized based on the estimated pest severity index. The generated models can be further enhanced continually based on one or more of historical (Continued)

data, participatory sensing inputs, crowdsourcing inputs and management practices.

9 Claims, 3 Drawing Sheets

(51) Int. Cl.
| | |
|---|---|
| *G06Q 10/04* | (2012.01) |
| *G06Q 10/06* | (2012.01) |
| *A01C 14/00* | (2006.01) |
| *A01M 17/00* | (2006.01) |
| *A01M 99/00* | (2006.01) |
| *G01W 1/00* | (2006.01) |

(52) U.S. Cl.
CPC .............. *G01W 1/00* (2013.01); *G06Q 10/04* (2013.01); *G06Q 10/067* (2013.01); *G06Q 50/02* (2013.01)

(58) Field of Classification Search
USPC ...................................................... 702/3, 189
See application file for complete search history.

(56) References Cited

U.S. PATENT DOCUMENTS

| | | | |
|---|---|---|---|
| 2002/0016676 A1* | 2/2002 | Sann ...................... | G06Q 10/06 702/3 |
| 2007/0005451 A1* | 1/2007 | Iwig ....................... | G06Q 10/04 705/26.1 |
| 2012/0101634 A1* | 4/2012 | Lindores .............. | A01B 79/005 700/266 |
| 2014/0012732 A1* | 1/2014 | Lindores .............. | A01B 79/005 705/37 |
| 2016/0150744 A1* | 6/2016 | Lin .................. | G06Q 10/06313 43/107 |

OTHER PUBLICATIONS

Zhang et al., "Incorporating natural enemies in an economic threshold for dynamically optimal pest management", Publisher: Elsevier, Ecological Modelling, vol. 220, Issues 9-10, pp. 1315-1324 (2009).

* cited by examiner

SYSTEMS AND METHODS FOR ESTIMATING EFFECTIVE PEST SEVERITY INDEX

PRIORITY CLAIM

This U.S. patent application claims priority under 35 U.S.C. § 119 to: India Application No. 201621000220 filed on 4 Jan. 2016. The entire contents of the aforementioned application are incorporated herein by reference.

TECHNICAL FIELD

The embodiments herein generally relate to integrated pest management, and more particularly to systems and methods for estimating effective pest severity index.

BACKGROUND

In the agricultural domain, one of the critical problems faced by farmers is deciding the timing and optimum usage of pesticides to minimize loss due to damaging influence of pests. While addressing pest control, it is imperative that natural enemies are conserved. It is a challenge for farmers to firstly predict the severity of pests for a given period of time under particular agronomic and weather conditions. Secondly, accurately accounting for the presence of natural enemies is even more challenging. Although farmers are aware of integrated pest management being feasible by taking into consideration natural enemies, the above mentioned practical challenges hinder optimal pesticide application thus failing to utilize effectively the presence of natural enemies. The complex relationships between pests, natural enemies, weather conditions and agronomic factors pose a big challenge to farmers in controlling pest severity below the Economic Threshold Level (ETL). Furthermore, over-use of pesticides due to ignorance of the natural enemy population and/or incorrect estimation of severity of pests leads to damage of crops.

SUMMARY

Embodiments of the present disclosure present technological improvements as solutions to one or more of the above-mentioned technical problems recognized by the inventors in conventional systems.

In an aspect, there is provided a computer implemented method for estimating effective pest severity index, the method comprising: receiving a first set of inputs pertaining to weather associated with a geo-location under consideration; receiving a second set of inputs pertaining to agronomic information; generating a pest forecasting model and a natural enemies forecasting model for each pest associated with the geo-location under consideration, the pest forecasting model and the natural enemies forecasting model being based on the received first set of inputs and the second set of inputs; and estimating the effective pest severity index based on the generated pest forecasting model and the natural enemies forecasting model.

In another aspect, there is provided a system for estimating effective pest severity index, the system comprising: one or more internal data storage devices comprising instructions; and one or more processors operatively coupled to the one or more internal data storage devices, the one or more processors being configured by the instructions to: receive a first set of inputs pertaining to weather associated with a geo-location under consideration; receive a second set of inputs pertaining to agronomic information; generate a pest forecasting model and a natural enemies forecasting model for each pest associated with the geo-location under consideration, the pest forecasting model and the natural enemies forecasting model being based on the received first set of inputs and the second set of inputs; and estimate the effective pest severity index based on the generated pest forecasting model and the natural enemies forecasting model.

In an embodiment, the method described herein above further comprises creating a historical data lookup table based on the received first set of inputs and the second set of inputs and the estimated effective pest severity index; appending the historical data lookup table with actual effective pest severity index detected for the corresponding first set of inputs and the second set of inputs for a given period of time; and updating the pest forecasting model and the natural enemies forecasting model based on the actual effective pest severity index.

In an embodiment, the received first set of inputs and the second set of inputs comprise at least one of participatory sensing inputs and crowd sourcing inputs.

In an embodiment, updating the pest forecasting model and the natural enemies forecasting model is further based on management practices deployed in the geo-location under consideration.

In an embodiment, the method described herein above further comprises optimizing pesticide application based on the estimated effective pest severity index.

In an embodiment, the one or more processors of the system described herein above are configured to perform the one or more methods described in various embodiments herein above.

In yet another aspect, there is provided a computer program product for processing data, comprising a non-transitory computer readable medium having program instructions embodied therein for receiving a first set of inputs pertaining to weather associated with a geo-location under consideration; receiving a second set of inputs pertaining to agronomic information; generating a pest forecasting model and a natural enemies forecasting model for each pest associated with the geo-location under consideration, the pest forecasting model and the natural enemies forecasting model being based on the received first set of inputs and the second set of inputs; and estimating the effective pest severity index based on the generated pest forecasting model and the natural enemies forecasting model.

It is to be understood that both the foregoing general description and the following detailed description are exemplary and explanatory only and are not restrictive of the invention, as claimed.

BRIEF DESCRIPTION OF THE DRAWINGS

The embodiments herein will be better understood from the following detailed description with reference to the drawings, in which.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing system or processor, whether or not such computing system or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Pest management is integral to management practices deployed in a geo-location under consideration. Conventionally, pest management has involved collection of data pertaining to pests. Since presence of pests is very dynamic and depends on several agronomic and weather related parameters, monitoring of pests and computing their numbers is practically impossible. For effective estimation of pest severity, it is also important to consider the presence of natural pests. Again, computing the population of natural enemies, besides posing practical limitations, may not be accurate. Manually visiting the field for data collection is a cumbersome process and is inaccurate and not scalable. Systems and methods of the present disclosure aggregate all data that can possibly influence pest control and facilitate prediction of pest severity and natural enemies population by generating a pest forecasting model and a natural enemies forecasting model which in turn are used to estimate the effective pest severity index. The pest and natural enemies forecasting models are further enhanced by participatory sensing and crowdsourcing inputs. Historical data on actual effective pest severity index and management practices deployed can also be used to further enhance the pest and natural enemies forecasting models.

Figure 1:
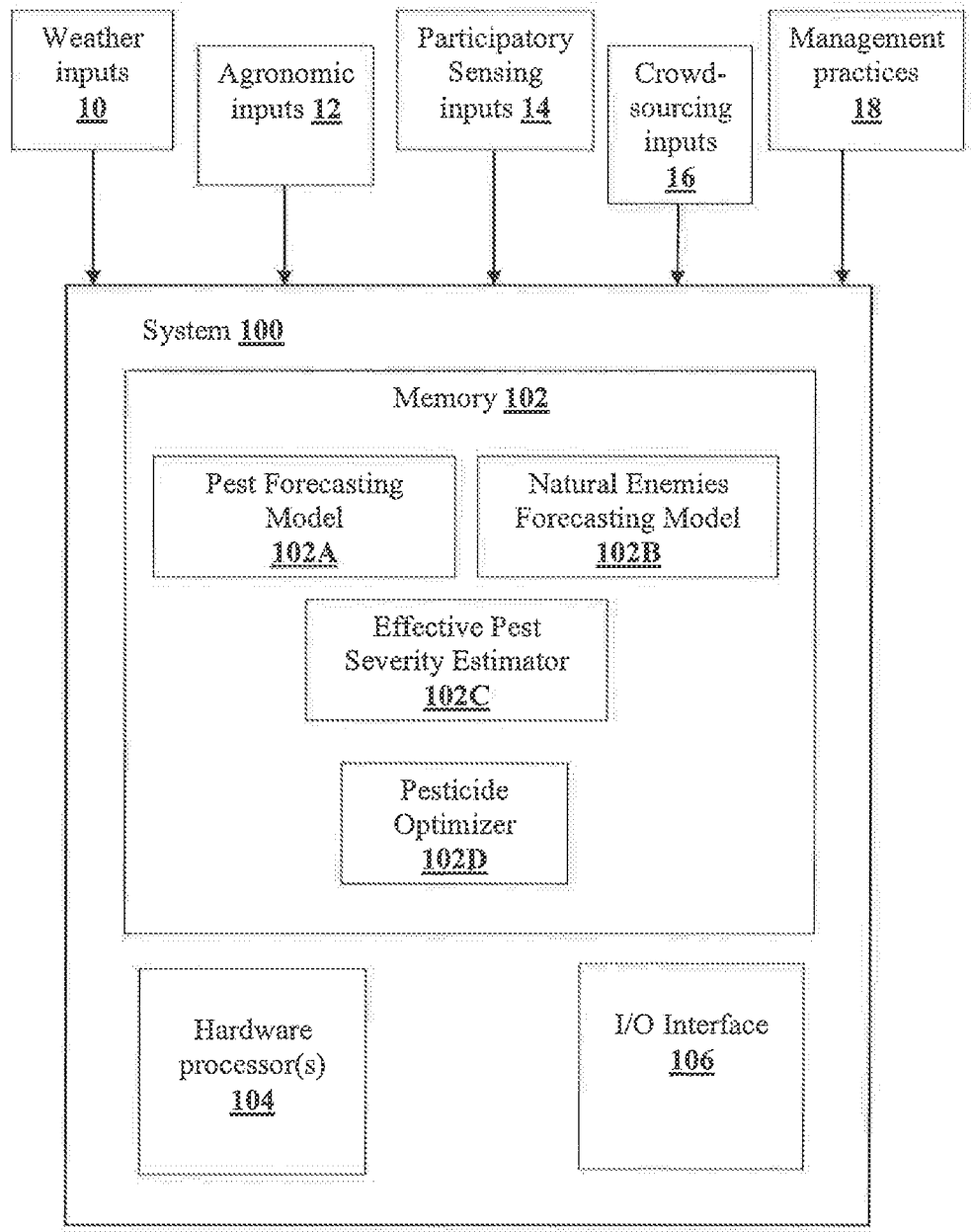
FIG. 1 illustrates a block diagram of a system for estimating effective pest severity index in accordance with an embodiment of the present disclosure.
Figure 2:
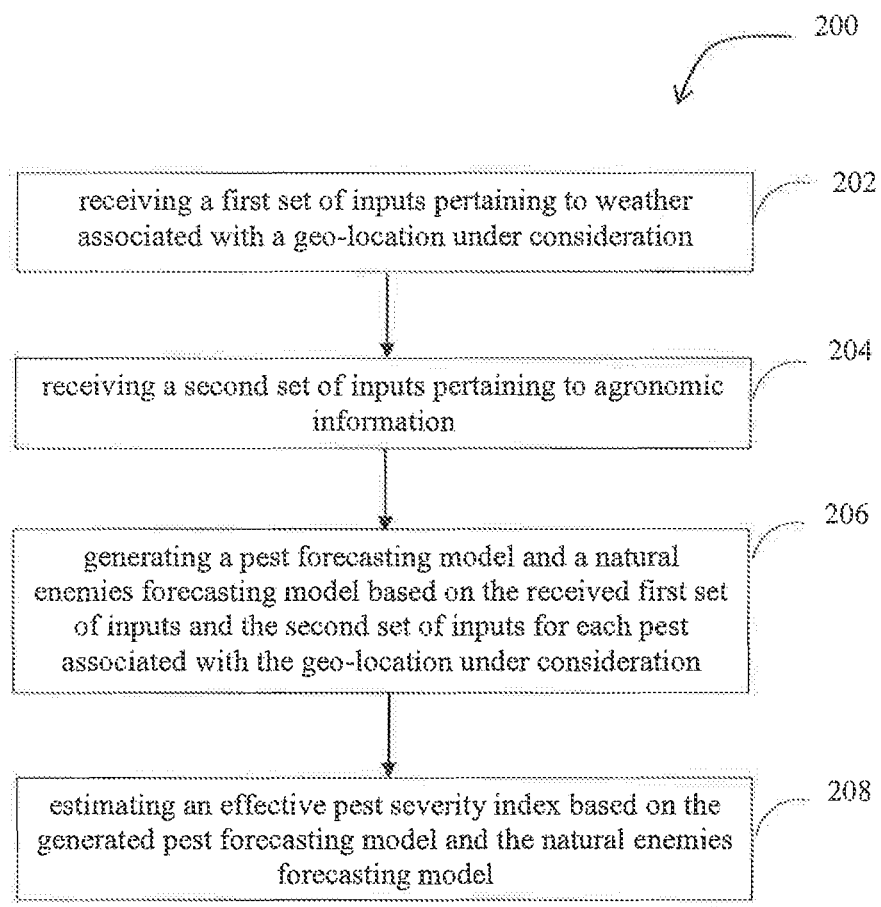
FIG. 2 is an exemplary flow diagram illustrating a computer implemented method for estimating effective pest severity index in accordance with an embodiment of the present disclosure.
Figure 3:
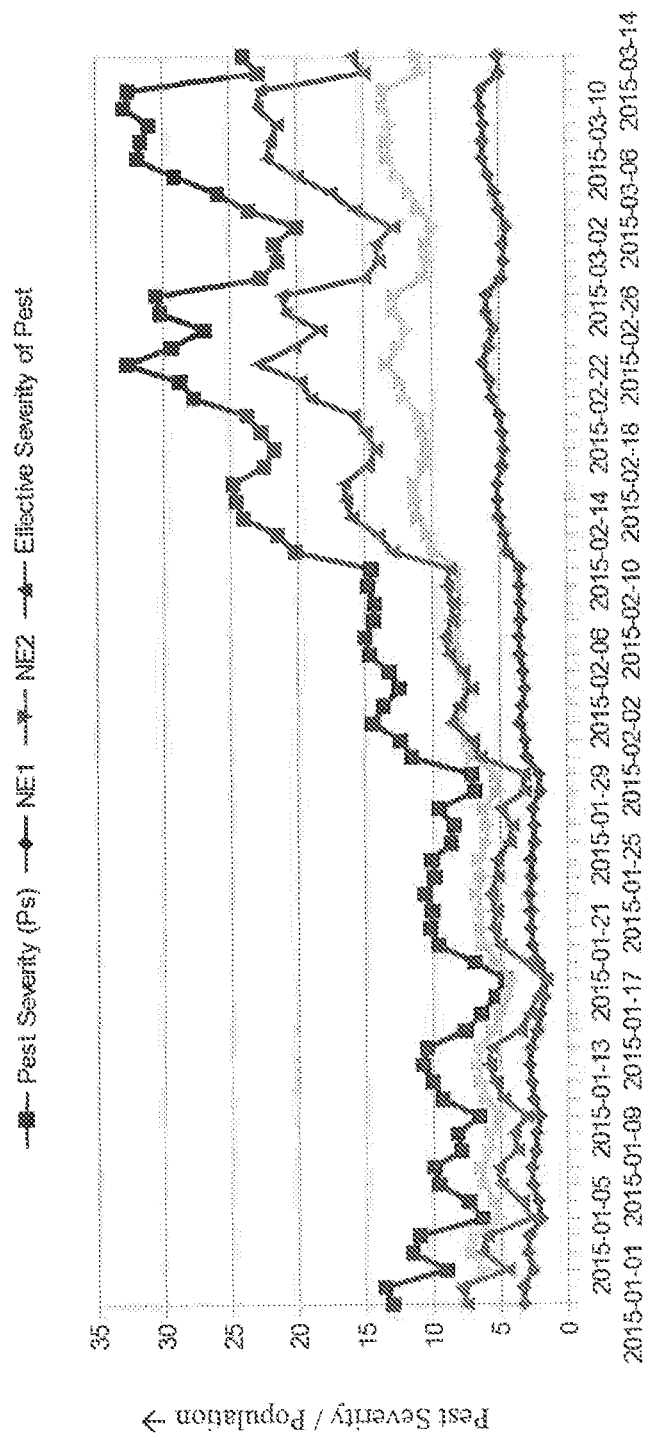
FIG. 3 illustrates a graphical representation of pest severity, natural enemies population and effective pest severity index over a period of time for an exemplary use case, in accordance with the present disclosure.

Referring now to the drawings, and more particularly to FIGS. 1 through 3, where similar reference characters denote corresponding features consistently throughout the figures, there are shown preferred embodiments and these embodiments are described in the context of the following exemplary device and method.

FIG. 1 illustrates a block diagram of a system 100 for estimating effective pest severity index and FIG. 2 is an exemplary flow diagram illustrating a computer implemented method 200 for estimating effective pest severity index, in accordance with an embodiment of the present disclosure.

In an embodiment, the system 100 includes one or more hardware processors 104, communication interface device or input/output (I/O) interface 106, and memory 102 or one or more internal data storage devices operatively coupled to the one or more processors. The one or more processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as a laptop computer, a desktop computer, a notebook, a workstation, a mainframe computer, a server, a network server, cloud, hand-held device, wearable device and the like.

The I/O interface device 106 can include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface device 106 can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, various modules 102A through 102D of the system 100 can be stored in the memory 102 as illustrated.

The steps of the computer implemented method 200 of the present disclosure will now be explained with reference to the components of the system 100 as depicted in FIG. 1. In an embodiment, at step 202, the system 100 is configured to receive via an input module (not shown), a first set of inputs viz., weather inputs 10 associated with a geo-location under consideration. In an embodiment, the weather inputs 10 can be received via Wireless Sensor Networks (WSN), Automatic Weather Stations (AWS), weather satellites, and the like. In an embodiment, the weather inputs 10 can comprise data pertaining to temperature, rainfall, Growing Degree Days (GDD), humidity, and such other weather parameters that are critical to crop management and pest control.

At step 204, the system 100 is configured to receive via the input module (not shown), a second set of inputs pertaining to agronomic information. In an embodiment the second set of inputs or agronomic inputs 12 are remote sensing data for the geo-location under consideration such as satellite image of the terrain, that can be obtained via satellites, UAVs, terrestrial sensors, and such other systems that operate on geo-spatial technologies and provide geo-spatial datasets.

In an embodiment, various vegetation, soil and water related indices are derived from the remote sensing data received as agronomic inputs 12. In an embodiment, vegetation index can be Normalized Difference Vegetation Index (NDVI) and soil and water related indices can be Soil brightness index and Normalized Difference Water Index (NDWI).

At step 206, a pest forecasting model 102A and a natural enemies forecasting model 102B are generated based on the received weather inputs 10 and the agronomic inputs 12 for each pest associated with the geo-location under consideration. In an embodiment, pest severity forecasted for $n^{th}$ day is a function of Growing degree days, weather parameters that are comprised in the first set of inputs, vegetation and other indices derived from the second set of inputs, season of the year and geographical region as represented generally herein below—

$$P(n)=f(GDD,W,VI,G,T)$$

In an embodiment, population of natural enemies forecasted for $n^{th}$ day is a function of one or more of pest severity forecasted for the $n^{th}$ day, weather parameters that are comprised in the first set of inputs, vegetation and other indices derived from the second set of inputs, season of the year and geographical region as represented generally herein below—

$$NE(n)=f(P(n),W,VI,G,T),$$

wherein,

P(n): Pest severity forecasted for $n^{th}$ day,

NE(n): Population of Natural Enemies forecasted for $n^{th}$ day,

GDD: Growing degree days,

VI: Vegetation and other indices derived from remote sensing data,

W: Weather parameters like temperature, humidity, rainfall, etc.,

T: Season of the year, and

G: Geographical region.

At step 208, the effective pest severity index is estimated, by an effective pest severity estimator 102C, based on the generated pest forecasting model 102A and the natural enemies forecasting model 102B as represented herein below—

$$EP(n)=P(n)-\alpha NE(n),$$

wherein,

EP(n): Effective pest severity on $n^{th}$ day, and

α: scaling factor (dependent on season, stage (egg, adult, lava) of pest as well as natural enemy)

In an embodiment, the generated pest forecasting model 102A and the natural enemies forecasting model 102B are enhanced by historical data. For instance, the memory 102 can include a historical data lookup table (not shown) that stores the received weather inputs 10, the agronomic inputs 12 and the estimated effective pest severity index EP(n). In accordance with the present disclosure, the historical data lookup table is appended by the actual effective pest severity index detected for the corresponding weather inputs 10 and the agronomic inputs 12. The historical data lookup table is then used to dynamically update the pest forecasting model 102A and the natural enemies forecasting model 102B.

In an embodiment, the generated pest forecasting model 102A and the natural enemies forecasting model 102B are enhanced by at least on of participatory sensing inputs and crowdsourcing inputs. For instance, farmers or local people residing in the geo-location under consideration may contribute towards the body of knowledge by collecting events from the farms during the life cycle of pests and presence of natural enemies. In another exemplary method, ground truth in the form of images with geo-coordinates of leaves, trees, pest affected areas with tags or comments from farmers or the local people may be solicited by way of crowdsourcing. Such additional inputs increase effectiveness and reliability of the generated pest forecasting model 102A and the natural enemies forecasting model 102B. In an embodiment, the system 100 can further include a task generation module (not shown) that can be configured to generate tasks for seeking specific information by way of crowdsourcing. In an embodiment, such tasks can be based on the historical data lookup table that is dynamically updated to provide an overview of gaps, if any, between the estimated effective pest severity index and the actual effective pest severity index and by seeking specific information can facilitate enhancing the accuracy and reliability of the pest forecasting model 102A and the natural enemies forecasting model 102B.

In an embodiment, the pest forecasting model 102A and the natural enemies forecasting model 102B are further enhanced based on management practices deployed in the geo-location under consideration. For instance, farmers and local people deploy several management practices for sustaining agricultural productivity such as nutrient management, pollination management, and the like which directly or indirectly impact pest severity and population of natural enemies. In accordance with the present disclosure, these inputs are considered for making the generated pest forecasting model 102A and the natural enemies forecasting model 102B further effective and reliable.

FIG. 3 illustrates a graphical representation of pest severity, natural enemies population and effective pest severity index over a period of time for an exemplary partially simulated use case, in accordance with the present disclosure. The severity of pests and population of natural enemies is dependent on various factors such as weather data, satellite data, stage of the crop, region, time of the year etc. which are captured as the first set of inputs and the second set of inputs by the system 100 of the present disclosure. The system and method of the present disclosure was studied on tea crop in a region in West Bengal and a pest forecasting model was generated for a pest, red spider mite. Based on empirical data and domain knowledge, it is known that severity of red spider mite is dependent on humidity and temperature. Accordingly, in the non-limiting exemplary use case, a pest forecasting model as shown below was generated to predict pest severity 7 days in advance—

$$Ps=(0.36*T)-(0.00034*H)+(0.031*T^2)-(0.0005*H^2)+0.078,$$

wherein

Ps: pest severity,

T: average temperature for the day, and

H: average humidity for the day.

The constants in the pest forecasting model are computed for the pest under consideration, red spider mite based on the dependency parameters of the study namely humidity and temperature and also the agronomic conditions associated with the geo-location under consideration namely West Bengal.

Further, natural enemies forecasting models were generated for two natural enemies *Stethorus gilvifrons, Agistemus hystrix Chrysoperla carnea* associated with the pest red spider mite.

Natural enemies forecasting model for *Stethorus gilvifrons*, as shown below was generated to predict its population 7 days in advance using scaling factor $\alpha 1=0.3$—

$$NE1=(0.22*T)-(0.011*H)+(0.00094*T^2)-0.06$$

wherein

NE1: *Stethorus gilvifrons* population,

T: average temperature for the day, and

H: average humidity for the day.

Again, natural enemies forecasting model for *Agistemus hystrix Chrysoperla carnea*, as shown below was generated to predict its population 7 days in advance using scaling factor $\alpha 2=0.6$—

$$NE2=(0.51*T)-(0.018*H)+0.0047$$

wherein

NE2: *Agistemus hystrix Chrysoperla carnea* population,

T: average temperature for the day, and

H: average humidity for the day.

The constants in the natural enemies forecasting model are also computed for the natural enemies under consideration based on the dependency parameters of the study namely humidity and temperature and also the agronomic conditions associated with the geo-location under consideration namely West Bengal.

In accordance with the present disclosure, effective pest severity index EP is estimated based on the generated pest forecasting model and the natural enemies forecasting models as shown below—

$$EP = Ps - \alpha_1 * NE_1 - \alpha_2 * NE_2$$

In the exemplary use case, weather inputs for the months of January-July 2015 was considered. The graph as illustrated in FIG. 3 shows that natural enemies make a huge impact on pest severity and accordingly it can be seen that the effective pest severity is lesser when pest severity is considered along with the natural enemies population. It may be understood that the above use case for the pest, red spider mite and the natural enemies *Stethorus gilvifrons, Agistemus hystrix Chrysoperla carnea* considered are merely exemplary in nature. Also the first set of inputs and the second set of inputs considered are purely exemplary. The present disclosure enables more complex forecasting models based on the extent of factors considered for generating the models.

Thus, in accordance with the present disclosure, pesticide application can be optimized, by a pesticide optimizer 102D, based on the estimated effective pest severity as against the pest severity alone which could have adverse effects on crop productivity and also cause avoidable harm to natural enemies. In an embodiment, quantity and timing of pesticide application can be recommended when the estimated effective pest severity index is greater than the Economic Threshold Level (ETL).

Dissemination of information about the pests and their natural enemies can be provided to farmers based on the continually updated pest forecasting model and the natural enemies forecasting model through different means like mobile applications, web console, IVR, etc.

The written description describes the subject matter herein to enable any person skilled in the art to make and use the embodiments of the present disclosure. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The system may also include software means. Alternatively, the system of the present disclosure may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the device of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as software and/or hardware modules and may be stored in any type of non-transitory computer readable medium or other storage device. Some non-limiting examples of non-transitory computer-readable media include CDs, DVDs, BLU-RAY, flash memory, and hard disk drives.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" Include plural references unless the context clearly dictates otherwise.

It is intended that the disclosure and examples be considered as exemplary only, with a true scope and spirit of disclosed embodiments being indicated by the following claims.

What is claimed is:

1. A computer implemented method for estimating effective pest severity index, the method comprising:

receiving a first set of inputs pertaining to weather associated with a geo-location under consideration;

receiving a second set of inputs pertaining to agronomic information associated with the geo-location under consideration;

generating a pest forecasting model and a natural enemies forecasting model for each pest associated with the geo-location under consideration, the pest forecasting model and the natural enemies forecasting model being based on the received first set of inputs and the second set of inputs, wherein the pest forecasting model is generated based on weather parameters derived from the first set of inputs, vegetation, soil and water indices derived from the second set of inputs, season of a year and a geographical region and wherein the natural enemies forecasting model is generated based on the pest forecasting model, the weather parameters derived from the first set of inputs, the vegetation, soil and water indices derived from the second set of inputs, the season of the year and the geographical region;

receiving participatory sensing information and crowdsourcing information associated with each pest and natural enemies in the geo-location under consideration for a period of time, wherein the participatory sensing information and crowdsourcing information comprise events from the geo-location under consideration during a life cycle of pests and natural enemies and images with geo-coordinates of pest affected areas;

dynamically updating the pest forecasting model and the natural enemies forecasting model based on the participatory sensing information and crowdsourcing information; wherein the pest forecasting model and the natural enemies forecasting model are dynamically updated based on a historical data lookup table of actual effective pest severity index detected for the corresponding first set of inputs and the second set of inputs for a given period of time; and estimating the effective pest severity index based on the dynamically updated pest forecasting model and the natural enemies forecasting model, whereby a quantity and a timing of a pesticide application is recommended based on the estimated effective pest severity index, when the estimated effective pest severity index is greater than an Economic Threshold Level and the effective pest severity index is estimated as:

$$EP(n)=P(n)-\alpha NE(n),$$

wherein, EP(n) is Effective pest severity on $n^{th}$ day, P(n) is Pest severity forecasted for $n^{th}$ day, NE(n) is Population of Natural Enemies forecasted for $n^{th}$ day and a is scaling factor dependent on the season and a stage of pest as well as natural enemy.

2. The computer implemented method of claim 1 further comprising:

creating the historical data lookup table based on the received first set of inputs and the second set of inputs and the estimated effective pest severity index;

appending the historical data lookup table with the actual effective pest severity index; and updating the pest forecasting model and the natural enemies forecasting model based on the actual effective pest severity index.

3. The computer implemented method of claim 2, wherein updating the pest forecasting model and the natural enemies forecasting model is further based on management practices deployed in the geo-location under consideration.

4. The computer implemented method of claim 1, further comprising optimizing pesticide application based on the estimated effective pest severity index.

5. A system for estimating effective pest severity index, the system comprising:

one or more internal data storage devices comprising instructions; and one or more processors operatively coupled to the one or more internal data storage devices, the one or more processors being configured by the instructions to:

receive a first set of inputs pertaining to weather associated with a geo-location under consideration;

receive a second set of inputs pertaining to agronomic information associated with the geo-location under consideration;

generate a pest forecasting model and a natural enemies forecasting model for each pest associated with the geo-location under consideration, the pest forecasting model and the natural enemies forecasting model being based on the received first set of inputs and the second set of inputs, wherein the pest forecasting model is generated based on weather parameters derived from the first set of inputs, vegetation, soil and water indices derived from the second set of inputs, season of a year and a geographical region and wherein the natural enemies forecasting model is generated based on the pest forecasting model, the weather parameters derived from the first set of inputs, the vegetation, soil and water indices derived from the second set of inputs, the season of the year and the geographical region;

receive participatory sensing information and crowdsourcing information associated with each pest and natural enemies in the geo-location under consideration for a period of time, wherein the participatory sensing information and crowdsourcing information comprise events from the geo-location under consideration during a life cycle of pests and natural enemies and images with geo-coordinates of pest affected areas;

dynamically update the pest forecasting model and the natural enemies forecasting model based on the participatory sensing information and crowdsourcing information; wherein the pest forecasting model and the natural enemies forecasting model are dynamically updated based on a historical data lookup table of actual effective pest severity index detected for the corresponding first set of inputs and the second set of inputs for a given period of time; and estimate the effective pest severity index based on the dynamically updated pest forecasting model and the natural enemies forecasting model, whereby a quantity and a timing of a pesticide application is recommended based on the estimated effective pest severity index, when the estimated effective pest severity index is greater than an Economic Threshold Level and the effective pest severity index is estimated as:

$$EP(n)=P(n)-\alpha NE(n),$$

wherein, EP(n) is Effective pest severity on $n^{th}$ day, P(n) is Pest severity forecasted for $n^{th}$ day, NE(n) is Population of Natural Enemies forecasted for $n^{th}$ day and a is scaling factor dependent on the season and a stage of pest as well as natural enemy.

6. The system of claim 5, wherein the one or more processors are further configured to:

create the historical data lookup table based on the received first set of inputs and the second set of inputs and the estimated effective pest severity index;

append the historical data lookup table with the actual effective pest severity index; and update the pest forecasting model and the natural enemies forecasting model based on the actual effective pest severity index.

7. The system of claim 6, wherein the one or more processors are further configured to update the pest forecasting model and the natural enemies forecasting model based on management practices deployed in the geo-location under consideration.

8. The system of claim 5, wherein the one or more processors are further configured to optimize pesticide application based on the estimated effective pest severity index.

9. A computer program product comprising a non-transitory computer readable medium having a computer readable program embodied therein, wherein the computer readable program, when executed on a computing device, causes the computing device to:

receive a first set of inputs pertaining to weather associated with a geo-location under consideration;

receive a second set of inputs pertaining to agronomic information associated with the geo-location under consideration;

generate a pest forecasting model and a natural enemies forecasting model for each pest associated with the geo-location under consideration, the pest forecasting model and the natural enemies forecasting model being based on the received first set of inputs and the second set of inputs, wherein the pest forecasting model is generated based on weather parameters derived from the first set of inputs, vegetation, soil and water indices derived from the second set of inputs, season of a year and a geographical region and wherein the natural enemies forecasting model is generated based on the pest forecasting model, the weather parameters derived from the first set of inputs, the vegetation, soil and water indices derived from the second set of inputs, the season of the year and the geographical region;

receive participatory sensing information and crowdsourcing information associated with each pest and natural enemies in the geo-location under consideration for a period of time, wherein the participatory sensing information and crowdsourcing information comprise events from the geo-location under consideration during a life cycle of pests and natural enemies and images with geo-coordinates of pest affected areas;

dynamically update the pest forecasting model and the natural enemies forecasting model based on the participatory sensing information and crowdsourcing information; wherein the pest forecasting model and the natural enemies forecasting model are dynamically updated based on a historical data lookup table of actual effective pest severity index detected for the corresponding first set of inputs and the second set of inputs for a given period of time; and estimate the effective pest severity index based on the dynamically updated pest forecasting model and the natural enemies forecasting model, whereby a quantity and a timing of a pesticide application is recommended based on the estimated effective pest severity index, when the estimated effective pest severity index is greater than an Economic Threshold Level and the effective pest severity index is estimated as:

$$EP(n) = P(n) - \alpha NE(n),$$

wherein, $EP(n)$ is Effective pest severity on $n^{th}$ day, $P(n)$ is Pest severity forecasted for $n^{th}$ day, $NE(n)$ is Population of Natural Enemies forecasted for $n^{th}$ day and a is scaling factor dependent on the season and a stage of pest as well as natural enemy.

* * * * *